(12) United States Patent
Hamamoto

(10) Patent No.: US 10,302,033 B2
(45) Date of Patent: May 28, 2019

(54) CONTROL SYSTEM OF INTERNAL COMBUSTION ENGINE AND CONTROL METHOD FOR THE CONTROL SYSTEM

(71) Applicant: TOYOTA JIDOSHA KABUSHIKI KAISHA, Toyota-shi, Aichi-ken (JP)

(72) Inventor: Yoshiaki Hamamoto, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 125 days.

(21) Appl. No.: 15/512,279

(22) PCT Filed: Sep. 22, 2015

(86) PCT No.: PCT/IB2015/001667
§ 371 (c)(1),
(2) Date: Mar. 17, 2017

(87) PCT Pub. No.: WO2016/046617
PCT Pub. Date: Mar. 31, 2016

(65) Prior Publication Data
US 2017/0292464 A1    Oct. 12, 2017

(30) Foreign Application Priority Data
Sep. 26, 2014    (JP) .................................. 2014-196516

(51) Int. Cl.
*F02D 41/02*    (2006.01)
*B60W 10/06*    (2006.01)
(Continued)

(52) U.S. Cl.
CPC ........... *F02D 41/024* (2013.01); *B60W 10/06* (2013.01); *B60W 10/08* (2013.01); *B60W 10/26* (2013.01);
(Continued)

(58) Field of Classification Search
CPC ...... F02D 41/024; F02D 41/10; F01N 11/002; F01N 3/10; F02P 5/15; Y02T 10/6286;
(Continued)

(56) References Cited

U.S. PATENT DOCUMENTS

2004/0237510 A1    12/2004    Kusada et al.
2013/0338864 A1*   12/2013    Shallvari ............... B60W 10/06
                                                          701/22

(Continued)

FOREIGN PATENT DOCUMENTS

JP    2003-247417 A    9/2003
JP    2004-124826 A    4/2004
JP    2005-009474 A    1/2005

*Primary Examiner* — Mary Cheung
(74) *Attorney, Agent, or Firm* — Sughrue Mion, PLLC

(57) ABSTRACT

In a hybrid vehicle, in a case where a temperature of a catalyst is equal to or larger than a prescribed temperature that is a temperature at which purification of an exhaust gas in the catalyst begins, and charging of a storage battery is not restricted, at least one of an engine load, an engine speed, and a retard angle amount of an ignition timing is made to gradually increase, and in a case where the temperature of the catalyst is equal to or larger than the prescribed temperature and the charging of the storage battery is restricted, the engine load is fixed and at least one of the engine speed and the retard angle amount of the ignition timing is made to gradually increase.

5 Claims, 6 Drawing Sheets

(51) Int. Cl.
| | |
|---|---|
| *B60W 10/08* | (2006.01) |
| *B60W 20/00* | (2016.01) |
| *B60W 20/13* | (2016.01) |
| *B60W 20/16* | (2016.01) |
| *B60W 30/188* | (2012.01) |
| *B60W 10/26* | (2006.01) |
| *F01N 3/10* | (2006.01) |
| *F01N 11/00* | (2006.01) |
| *F02D 41/10* | (2006.01) |
| *F02P 5/15* | (2006.01) |

(52) U.S. Cl.
CPC ............ *B60W 20/00* (2013.01); *B60W 20/13* (2016.01); *B60W 20/16* (2016.01); *B60W 30/1882* (2013.01); *F01N 3/10* (2013.01); *F01N 11/002* (2013.01); *F02D 41/10* (2013.01); *F02P 5/15* (2013.01); *B60W 2510/244* (2013.01); *B60W 2530/12* (2013.01); *B60W 2710/0677* (2013.01); *Y02T 10/54* (2013.01); *Y02T 10/6286* (2013.01)

(58) Field of Classification Search
CPC ... Y02T 10/54; B60W 10/26; B60W 30/1882; B60W 20/16; B60W 20/00; B60W 20/13; B60W 10/06; B60W 10/08; B60W 2710/0677; B60W 2510/244; B60W 2530/12
See application file for complete search history.

(56) References Cited

U.S. PATENT DOCUMENTS

| | | | |
|---|---|---|---|
| 2014/0020363 A1* | 1/2014 | Sasaki | F01N 3/10 60/274 |
| 2016/0052508 A1* | 2/2016 | Teraya | F01N 3/20 701/22 |

* cited by examiner

TOTAL FUEL INJECTION AMOUNT REQUIRED
FOR PREHEATING OF THE CATALYST (G)

ENGINE LOAD

HC+NOx(g/s)

ENGINE LOAD

CONTROL SYSTEM OF INTERNAL COMBUSTION ENGINE AND CONTROL METHOD FOR THE CONTROL SYSTEM

CROSS REFERENCE TO RELATED APPLICATIONS

This application is a National Stage of International Application No. PCT/IB2015/001667 filed Sep. 22, 2015, claiming priority based on Japanese Patent Application No. 2014-196516 filed Sep. 26, 2014, the contents of all of which are incorporated herein by reference in their entirety.

BACKGROUND OF THE INVENTION

1. Field of the Invention

The invention relates to a control system of an internal combustion engine, and a control method for the control system.

2. Description of Related Art

In a hybrid vehicle in which an internal combustion engine and an electric motor are mounted, there is a known case where an ignition timing is set to a retard angle in order to raise a temperature of a catalyst. Herein, if only the ignition timing is set to the retard angle, an engine speed lowers, so it is expected that an air intake amount and a fuel injection amount are made to increase in cooperation with the retard angle of the ignition timing. At this time, since the temperature of the catalyst is low, purification of harmful substances in an exhaust gas may become difficult. Accordingly, it is preferred that an amount of harmful substances in the exhaust gas flowing into the catalyst is comparatively small.

Herein, in the hybrid vehicle in which the internal combustion engine and the electric motor are mounted, there is a known case where the air intake amount is made to increase after a period of time has elapsed since the ignition timing is set to the retard angle, thus the harmful substances in the exhaust gas are made to decrease and the temperature of the catalyst is made to rise (see Japanese Patent Application Publication No. 2004-124826 (JP 2004-124826 A), for example).

When the air intake amount increases, an engine torque increases, but in the hybrid vehicle, an increment of the engine torque can be absorbed by executing a power generation based on the electric motor (also called an electric generator). However, when the storage battery becomes a fully charged state and charging of the storage battery is restricted, the power generation based on the electric motor also becomes difficult. In this case, it is hard to make the air intake amount increase, and it is also hard to make the retard angle amount of the ignition timing increase. Accordingly, there exists a possibility that it takes time to preheat the catalyst.

Moreover, when the retard angle amount of the ignition timing is excessively increased or the engine torque is excessively increased in order to make the temperature of the catalyst rise rapidly, the amount of harmful substances discharged from the internal combustion engine may increase. Furthermore, there exists a possibility that it is difficult to purify the harmful substances, in a state where the temperature of the catalyst is low. That is, the amount of harmful substances flowing out of the catalyst will increase due to the increment of the engine torque or the retard angle amount of the ignition timing.

SUMMARY OF THE INVENTION

An object of the invention is to suppress an outflow of harmful substances from a catalyst and rapidly raise a temperature of the catalyst.

The first aspect of the invention provides a control system of an internal combustion engine, including a control device, which makes a temperature of a catalyst rise, the catalyst being provided on an exhaust passage of the internal combustion engine in a hybrid vehicle having the internal combustion engine and an electric motor, wherein: in a case where the temperature of the catalyst is equal to or larger than a prescribed temperature that is a temperature at which purification of an exhaust gas in the catalyst begins, and charging of a storage battery is not restricted, the control device makes at least one of an engine load, an engine speed, and a retard angle amount of an ignition timing gradually increase, and in a case where the temperature of the catalyst is equal to or larger than the prescribed temperature and the charging of the storage battery is restricted, the control device fixes the engine load and makes at least one of the engine speed and the retard angle amount of the ignition timing gradually increase.

Even if the temperature of the catalyst is equal to or larger than the prescribed temperature, its purification ability with respect to the exhaust gas till a full activation is low. Moreover, when the temperature of the catalyst is equal to or larger than the prescribed temperature and till the catalyst is fully activated, the higher the temperature of the catalyst is, the higher the purification ability of the catalyst will be. Herein, if at least one of an increase of the engine load, an increase of the engine speed and the retard angle of the ignition timing is executed, more heat can be discharged from the internal combustion engine. That is, any one of the increase of the engine load, the increase of the engine speed and the retard angle of the ignition timing is accompanied with an increase of a fuel injection amount per unit time, so an amount of heat supplied to the catalyst per unit time can be further increased. Accordingly, the temperature of the catalyst can be made to rise rapidly. It should be noted that if only the ignition timing is made to be the retard angle, the engine speed lowers, so an air intake amount and a fuel injection amount may be made to increase in cooperation with the retard angle of the ignition timing.

Herein, the more the engine load, the engine speed or the retard angle amount of the ignition timing increases, the higher a temperature rise effect of the catalyst is. However, the more the engine load, the engine speed or the retard angle amount of the ignition timing increases, the more the harmful substances (purified substances) in the exhaust gas will increase. Although it is an amount of the harmful substances that can be purified if the catalyst is fully activated, in a case where the temperature of the catalyst is equal to or larger than the prescribed temperature and the catalyst is not fully activated, it is possible that the harmful substances cannot be wholly purified. Accordingly, before the catalyst is the fully activated, if the engine load, the engine speed or the retard angle amount of the ignition timing is excessively increased, the harmful substances may flow out of the catalyst, although the temperature of the catalyst may be made to rise.

In contrast, the harmful substances flowing out of the catalyst can be decreased by making at least one of the engine load, the engine speed and the retard angle amount of the ignition timing gradually increase. That is, by making at least one of the engine load, the engine speed and the retard angle amount of the ignition timing increase, the purification ability of the catalyst increases when the temperature of the catalyst rises. More harmful substances can be purified corresponding to the increase of the purification ability of the catalyst. If more harmful substances can be purified, correspondingly, even if the amount of the harmful substances discharged from the internal combustion engine increases, the harmful substances can be purified by the catalyst. Accordingly, if the amount of the harmful substances that can be purified in the catalyst increases, the engine load, the engine speed or the retard angle amount of the ignition timing can be further increased. At least one of the engine load, the engine speed and the retard angle amount of the ignition timing can be made to gradually increase by repeatedly performing the above case. That is, along with the rise of the temperature of the catalyst, even if at least one of the engine load, the engine speed and the retard angle amount of the ignition timing is made to gradually increase, outflow of the harmful substances from the catalyst can be suppressed. Furthermore, the rise of the temperature of the catalyst can be promoted by making at least one of the engine load, the engine speed and the retard angle amount of the ignition timing gradually increase.

However, a case that the engine load is made to increase is accompanied with a power generation based on the electric motor and charging of the storage battery. Herein, a chargeable capacity exists in the storage battery, so when the storage battery reaches a fully charged state, charging of the storage battery is restricted. In this case, it is hard to perform the power generation based on the electric motor. Accordingly, it is also hard to make the engine load increase. In this case, a case that the engine load is made to gradually increase is not executed, but the engine load is fixed, and the engine speed or the retard angle amount of the ignition timing is made to gradually increase, thus the temperature of the catalyst is made to rise.

It should be noted that when the engine load, the engine speed or the retard angle amount of the ignition timing gradually increases, it can continuously increase along with an elapse of time, or increase step by step. Moreover, in order to avoid the outflow of the harmful substances from the catalyst, the engine load, the engine speed or the retard angle amount of the ignition timing can be made to continuously increase or increase step by step in accordance with the temperature of the catalyst. The engine load, the engine speed or the retard angle amount of the ignition timing can take a value when the harmful substances discharged from the internal combustion engine are the fewest, or a value when the harmful substances discharged from the internal combustion engine are within an allowable range as a starting point, and gradually increase from the value serving as the starting point. A starting point of the ignition timing when the retard angle amount of the ignition timing is made to gradually increase can be set to an ignition timing when the temperature of the catalyst is smaller than the prescribed temperature. Moreover, the starting point of the ignition timing when the retard angle amount of the ignition timing is made to gradually increase is set to a value that is a retard angle as compared with an ignition timing in a state where the catalyst is fully activated. Moreover, a starting point of the engine load or the engine speed when the engine load or the engine speed is made to gradually increase can be set to an engine load or an engine speed when the temperature of the catalyst is smaller than the prescribed temperature.

Moreover, it is allowed that, in a case where the temperature of the catalyst is smaller than the prescribed temperature, the control device fixes the engine load, the engine speed and the retard angle amount of the ignition timing, and the engine load, the engine speed or the retard angle amount of the ignition timing in a case where the temperature of the catalyst is smaller than the prescribed temperature is set to a value smaller than a maximum value when the engine load, the engine speed or the retard angle amount of the ignition timing is made to gradually increase in a case where the temperature of the catalyst is equal to or larger than the prescribed temperature.

In a case where the temperature of the catalyst is smaller than the prescribed temperature, the exhaust gas can hardly be purified in the catalyst, so it is expected that the amount of the harmful substances discharged from the internal combustion engine is small. Herein, when the engine load, the engine speed or the retard angle amount of the ignition timing increases, the discharge amount of the harmful substances from the internal combustion engine increases. In this case, the purification of the harmful substances may hardly be performed. On the other hand, the increase of the discharge amount of the harmful substances can be suppressed by fixing the engine load, the engine speed or the retard angle amount of the ignition timing. Moreover, the amount of the harmful substances discharged from the internal combustion engine can be made to be comparatively small by setting the engine load, the engine speed or the retard angle amount of the ignition timing to a valve smaller than the maximum value when the values thereof are made to gradually increase. Even in this case, the temperature of the catalyst gradually rises. It should be noted that the engine load, the engine speed or the retard angle amount of the ignition timing can be set by making the amount of the harmful substances discharged from the internal combustion engine be within an allowable range, or by making the amount of the harmful substances discharged from the internal combustion engine be the fewest. Moreover, among the engine load, the engine speed and the retard angle amount of the ignition timing, a case that they do not gradually increase in a case where the temperature of the catalyst is equal to or larger than the prescribed temperature refers to a case that they are set to fixed values independently of the temperature of the catalyst till full activation of the catalyst.

The control device may make the engine load, the engine speed or the retard angle amount of the ignition timing increase corresponding to the temperature of the catalyst, when making the engine load, the engine speed or the retard angle amount of the ignition timing gradually increase.

That is, along with a rise of the temperature of the catalyst, the purification ability of the catalyst increases, and more harmful substances can be purified. If the engine load, the engine speed or the retard angle amount of the ignition timing is made to increase corresponding to the amount of the harmful substances that can be purified, the outflow of the harmful substances from the catalyst can be suppressed, and the temperature of the catalyst is made to rise more rapidly. The engine load, the engine speed or the retard angle amount of the ignition timing can be set corresponding to the temperature of the catalyst by making the amount of the harmful substances flowing into the catalyst become an amount that can be purified using the catalyst.

The second aspect of the invention provides a control method for a control system of an internal combustion engine, including a control device, which makes a temperature of a catalyst rise, the catalyst being provided on an exhaust passage of the internal combustion engine in a hybrid vehicle having the internal combustion engine and an electric motor, wherein: in a case where the temperature of the catalyst is equal to or larger than a prescribed temperature that is a temperature at which purification of an exhaust gas in the catalyst begins, and charging of a storage battery is not restricted, the control device makes at least one of an engine load, an engine speed, and a retard angle amount of an ignition timing gradually increase, and in a case where the temperature of the catalyst is equal to or larger than the prescribed temperature and the charging of the storage battery is restricted, the control device fixes the engine load and makes at least one of the engine speed and the retard angle amount of the ignition timing gradually increase.

According to each aspect of the invention, the outflow of the harmful substances from the catalyst can be suppressed, and the temperature of the catalyst can be raised rapidly.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Modes for carrying out the invention are exemplarily described in detail below based on an embodiment with reference to the drawings. However, as long as sizes, materials, shapes, relative configurations and the like of composite members recorded in the embodiment are not particularly recorded, the scope of the invention is not limited thereto.

Embodiment

Figure 1:
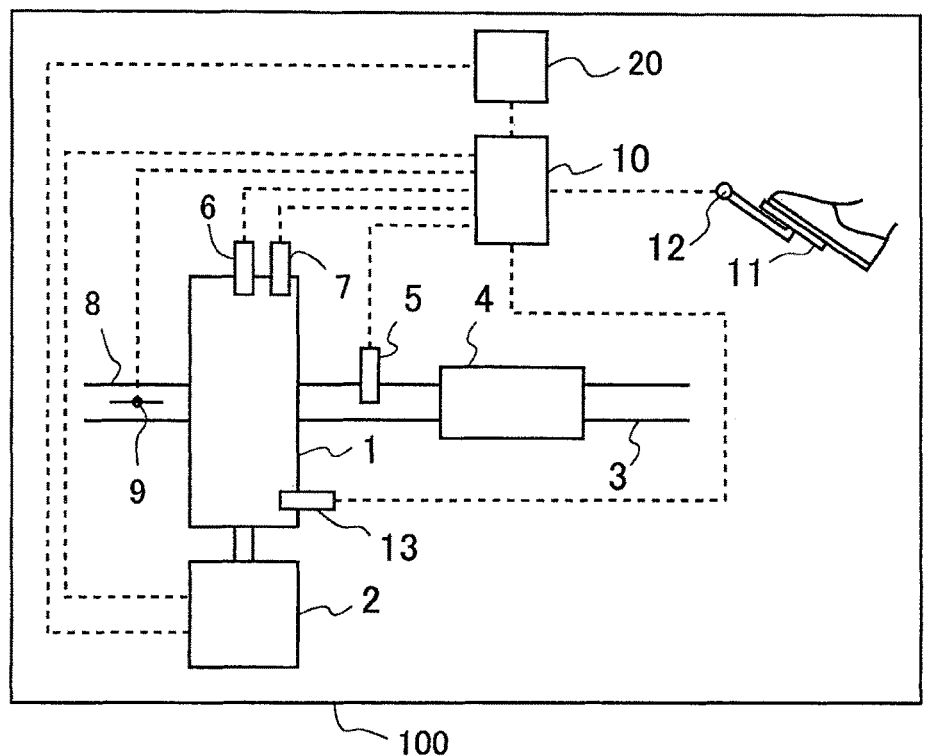
FIG. 1 is a view showing a general structure of a hybrid vehicle according to an embodiment.

FIG. 1 is a view showing a general structure of a hybrid vehicle 100 according to the embodiment. An internal combustion engine 1 is mounted in the hybrid vehicle 100. It should be noted that the internal combustion engine 1 is a gasoline engine. Moreover, an electric motor 2 is mounted in the hybrid vehicle 100. The electric motor 2 can rotate a crank shaft of the internal combustion engine 1, or can drive the hybrid vehicle 100. Moreover, a power generation can be performed by means of the electric motor 2 by using the internal combustion engine 1 as a power source. A storage battery 20 is connected to the electric motor 2 via an electrical wiring.

An exhaust passage 3 is connected to the internal combustion engine 1. A catalyst 4 is provided midway in the exhaust passage 3. The catalyst 4 is, for example, an oxidation catalyst, a three-way catalyst, an occlusion reduction NOx catalyst, a selective reduction NOx catalyst or the like. A purification performance of the catalyst 4 with respect to an exhaust gas changes in accordance with a temperature. In the case where the temperature of the catalyst 4 is smaller than a temperature at which purification of the exhaust gas in the catalyst 4 begins, i.e., a prescribed temperature, the exhaust gas cannot be purified in the catalyst 4. It should be noted that the catalyst 4 is described below as a three-way catalyst that can purify the HC and NOx.

A temperature sensor 5 that measures a temperature of an exhaust gas flowing through the exhaust passage 3 is installed on the exhaust passage 3 that is at an upstream side of the catalyst 4. The temperature sensor 5 outputs a signal corresponding to the temperature of the exhaust gas. A temperature of the catalyst 4 is calculated based on the output signal of the temperature sensor 5. It should be noted that the temperature sensor can be also installed on the catalyst 4 to measure the temperature of the catalyst 4. Moreover, the temperature of the catalyst 4 can be also deduced based on a running state of the internal combustion engine 1.

The internal combustion engine 1 is provided with a fuel injection valve 6 that injects fuel into a cylinder. It should be noted that the fuel injection valve 6 can also be a structure that injects the fuel into an intake passage of the internal combustion engine 1. Moreover, the internal combustion engine 1 is provided with a spark plug 7 that produces electric sparks in the cylinder. Moreover, an intake passage 8 is connected to the internal combustion engine 1, and the intake passage 8 is provided with a throttle valve 9.

Furthermore, the internal combustion engine 1 is provided with an ECU 10 serving as an electronic control unit for controlling the internal combustion engine 1 and the electric motor 2. In addition to a CPU, the ECU 10 further has a ROM, a RAM and the like that store various programs and maps, and controls the internal combustion engine 1, the electric motor 2 and the like in accordance with a running condition of the internal combustion engine 1 or requirements of a driver. It should be noted that in the embodiment, the ECU 10 corresponds to the control device of the invention.

In addition to the above sensor, an accelerator opening sensor 12 that outputs an electrical signal corresponding to an amount by which the driver steps into an accelerator pedal 11 and detects an engine load and a crank shaft position sensor 13 that detects an engine speed are further connected to the ECU 10 via electrical wirings, and output signals of the various sensors are input to the ECU 10.

The fuel injection valve 6, the spark plug 7 and the throttle valve 9 are connected to the ECU 10 via electrical wirings. The ECU 10 controls these devices.

Moreover, the storage battery 20 is connected to the ECU 10, and the ECU 10 calculates a state of charge (SOC) of the storage battery 20. Moreover, the electric motor 2 is connected to the ECU 10 via an electrical wiring, and the ECU 10 controls a power supply to the electric motor 2 or a power generation by the electric motor 2.

Furthermore, the ECU 10 performs a control that makes the temperature of the catalyst 4 rise (hereinafter referred to as a catalyst temperature rise control) in the case where the temperature of the catalyst 4 is low when the internal combustion engine 1 starts and the like. During the catalyst temperature rise control, at least one of a retard angle of an ignition timing of the spark plug 7, an increase of the engine speed and an increase of the engine load is performed. It should be noted that the increase of the engine load is not performed in accordance with the SOC of the storage battery 20.

Figure 2:
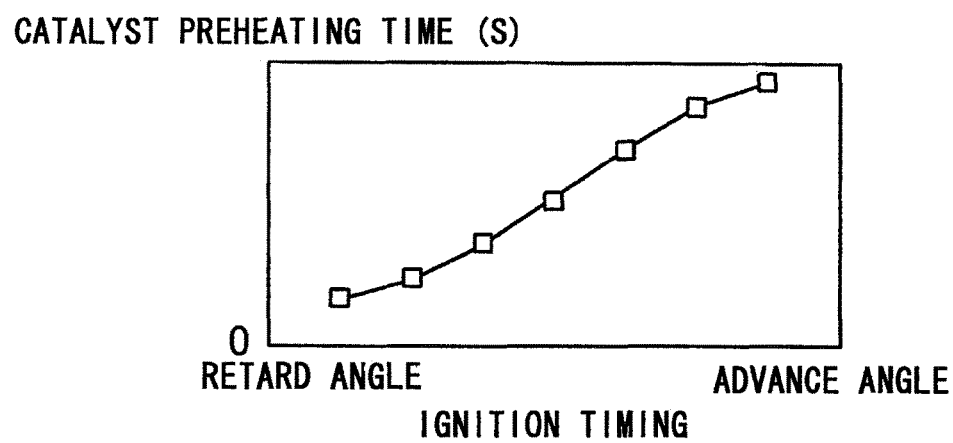
FIG. 2 is a view showing a relationship between an ignition timing and a catalyst preheating time.

Herein, FIG. 2 is a view showing a relationship between an ignition timing and a catalyst preheating time. The catalyst preheating time is a time required till completion of preheating of the catalyst 4. As shown in FIG. 2, the more the ignition timing is made to be the retard angle, the more heat supplied to the catalyst 4 per unit time can be increased, and the more the catalyst preheating time is shortened.

Figure 3:
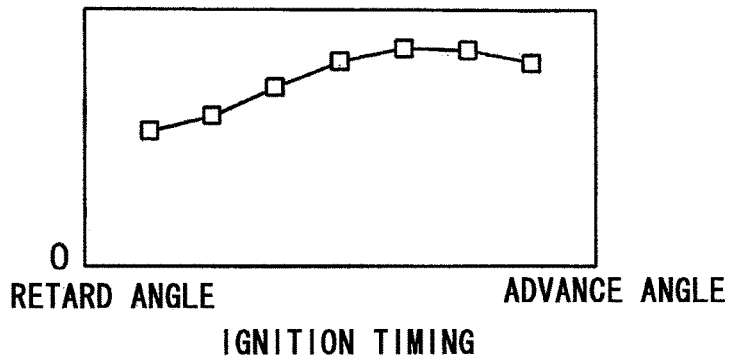
FIG. 3 is a view showing a relationship between the ignition timing and a total fuel injection amount required for preheating of the catalyst.

FIG. 3 is a view showing a relationship between the ignition timing and a total fuel injection amount required for preheating of the catalyst 4. A transverse axis corresponds to that in FIG. 2. The total fuel injection amount required for the preheating of the catalyst 4 is a total amount of the fuel required for the preheating of the catalyst 4 till the completion of the preheating of the catalyst 4. Herein, the more the retard angle amount of the ignition timing increases, the more the amount of the fuel injected from the fuel injection valve 6 per unit time increases, but since the temperature of the catalyst 4 rises rapidly, the time till the completion of the preheating of the catalyst 4 is shortened. Accordingly, the larger the retard angle amount of the ignition timing is, the smaller the total fuel injection amount required till the completion of the preheating of the catalyst 4 is. As shown in FIG. 3, the total fuel injection amount has a maximum value, and as compared with the ignition timing corresponding to the maximum value of the total fuel injection amount, the larger the retard angle amount is, the smaller the total fuel injection amount is. Accordingly, consumption of the fuel can be decreased by making the retard angle amount of the ignition timing increase as compared with the ignition timing when the total fuel injection amount becomes the maximum value, so deterioration of fuel efficiency can be suppressed.

Figure 4:
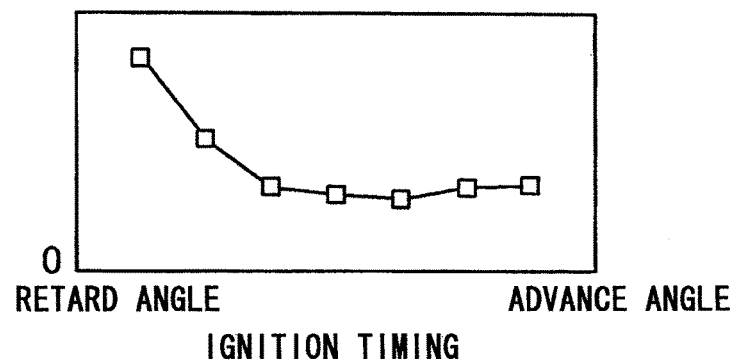
FIG. 4 is a view showing a relationship between the ignition timing and a discharge amount of HC and NOx per unit time.

FIG. 4 is a view showing a relationship between the ignition timing and a discharge amount of HC and NOx per unit time. A transverse axis corresponds to that in FIG. 2 and that in FIG. 3. The discharge amount of the HC and NOx is a mass of the HC and NOx discharged from the internal combustion engine 1 per unit time. The discharge amount of the HC and NOx has a minimum value, and as compared with the ignition timing corresponding to the minimum value of the discharge amount of the HC and NOx, the larger the retard angle amount is, the larger the discharge amount of the HC and NOx per unit time is. Accordingly, the amount of the HC and NOx in the exhaust gas can be increased, by making the retard angle amount of the ignition timing increase.

In this way, when the retard angle amount of the ignition timing is increased, the catalyst preheating time decreases, and the total fuel injection amount also decreases, but the discharge amount of the HC and NOx per unit time increases. Herein, the amount of the HC and NOx that can be purified per unit time in the catalyst 4 is determined in accordance with the temperature of the catalyst 4. Even if the discharge amount of the HC and NOx per unit time increases, as long as the discharge amount is within a range of amounts that can be purified by the catalyst 4, a case that the HC and NOx are discharged to the atmosphere can be suppressed. The purification performance of the catalyst 4 increases along with the rise of the temperature of the catalyst 4, so if the retard angle amount of the ignition timing is made to increase in accordance with the increase of the purification performance of the catalyst 4, the HC and NOx can be purified, and the catalyst preheating time and the total fuel injection amount are decreased.

However, when the temperature of the catalyst 4 is too low, the HC and NOx can hardly be purified. Herein, if the temperature of the catalyst 4 is equal to or larger than a prescribed temperature at which the purification of the exhaust gas in the catalyst 4 begins, the purification performance with respect to the HC and NOx increases along with the rise of the temperature of the catalyst 4. On the other hand, in the case where the temperature of the catalyst 4 is smaller than the prescribed temperature, the HC and NOx can hardly be purified in the catalyst 4. Accordingly, in the case where the temperature of the catalyst 4 is smaller than the prescribed temperature, it is preferred that the discharge amount of the HC and NOx is comparatively small. Accordingly, in the case where the temperature of the catalyst 4 is smaller than the prescribed temperature, the amount of the HC and NOx discharged to the atmosphere can be decreased by means of an ignition timing fixed as one when the discharge amount of the HC and NOx per unit time is comparatively small.

Figure 5:
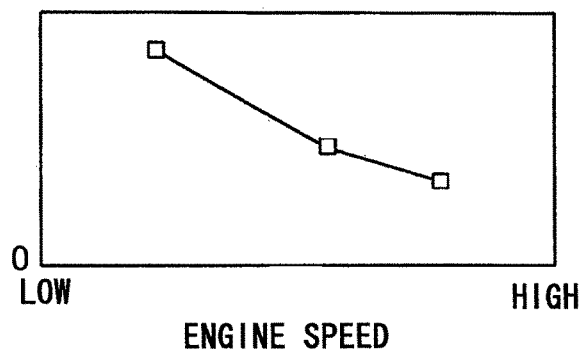
FIG. 5 is a view showing a relationship between an engine speed and the catalyst preheating time.

FIG. 5 is a view showing a relationship between an engine speed and the catalyst preheating time. The higher the engine speed is, the more the heat supplied to the catalyst 4 per unit time can be increased, so the catalyst preheating time is shortened.

Figure 6:
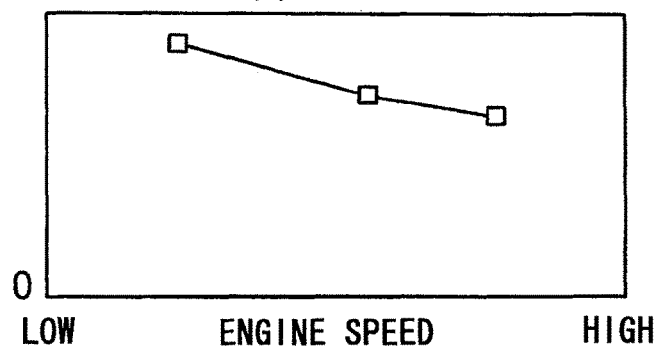
FIG. 6 is a view showing a relationship between the engine speed and the total fuel injection amount required for preheating of the catalyst.

FIG. 6 is a view showing a relationship between the engine speed and the total fuel injection amount required for preheating of the catalyst 4. A transverse axis corresponds to that in FIG. 5. Herein, the more the engine speed increases, the more the amount of the fuel injected from the fuel injection valve 6 per unit time increases, but since the temperature of the catalyst 4 rises rapidly, the time till the completion of the preheating of the catalyst 4 is shortened. Accordingly, the higher the engine speed is, the smaller the total fuel injection amount required till the completion of the preheating of the catalyst 4 is. Accordingly, the consumption of the fuel can be decreased by increasing the engine speed, so the deterioration of the fuel efficiency can be suppressed.

Figure 7:
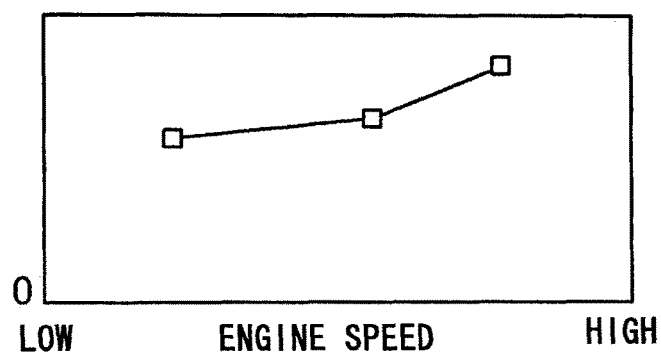
FIG. 7 is a view showing a relationship between the engine speed and the discharge amount of the HC and NOx per unit time.

FIG. 7 is a view showing a relationship between the engine speed and the discharge amount of the HC and NOx per unit time. A transverse axis corresponds to that in FIG. 5 and that in FIG. 6. The higher the engine speed is, the larger the discharge amount of the HC and NOx per unit time is. Accordingly, the amount of the HC and NOx in the exhaust gas can be increased by increasing the engine speed.

In this way, when the engine speed is increased, the catalyst preheating time decreases, and the total fuel injection amount also decreases, but the discharge amount of the HC and NOx per unit time increases. Herein, even if the discharge amount of the HC and NOx per unit time increases, as long as the discharge amount can be purified using the catalyst 4, the case that the HC and NOx are discharged to the atmosphere can be suppressed. The purification performance of the catalyst 4 increases along with the rise of the temperature of the catalyst 4, so if the engine speed is increased corresponding to the increase of the purification performance of the catalyst 4, the HC and NOx can be purified, and the catalyst preheating time and the total fuel injection amount are decreased.

However, as described above, in the case where the temperature of the catalyst 4 is smaller than the prescribed temperature, it is preferred that the discharge amount of the HC and NOx is comparatively small. Accordingly, in the case where the temperature of the catalyst 4 is smaller than the prescribed temperature, the amount of the HC and NOx discharged to the atmosphere can be decreased by means of an engine speed fixed as one when the discharge amount of the HC and NOx per unit time is comparatively small. It should be noted that when the engine speed is excessively lowered, noise and vibration will be produced, so the engine speed can be determined by making the noise and vibration be within an allowable range.

Figure 8:
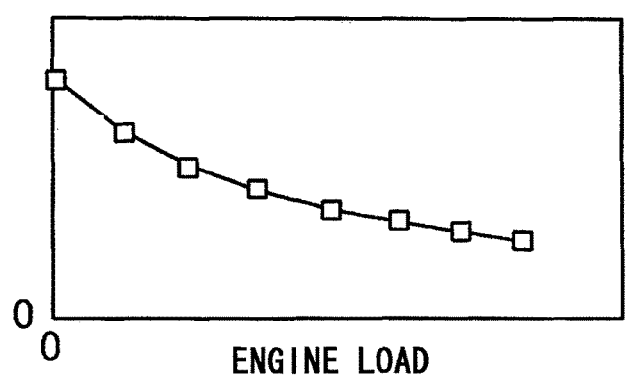
FIG. 8 is a view showing a relationship between an engine load and the catalyst preheating time.

FIG. 8 is a view showing a relationship between an engine load and the catalyst preheating time. The higher the engine load becomes, the more the heat supplied to the catalyst 4 per unit time can be increased, so the catalyst preheating time is shortened.

Figure 9:
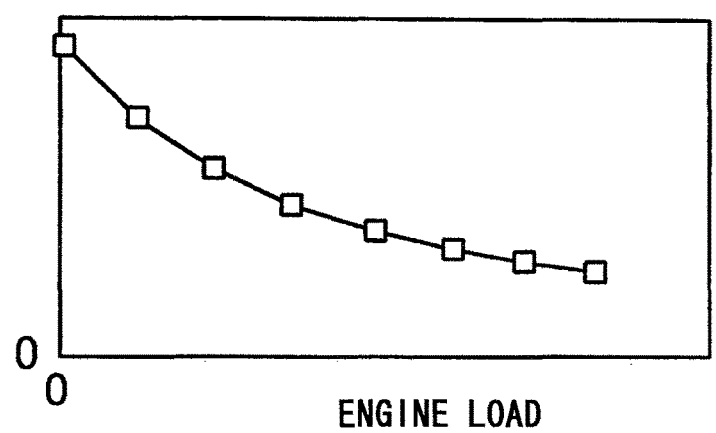
FIG. 9 is a view showing a relationship between the engine load and the total fuel injection amount required for preheating of the catalyst.

FIG. 9 is a view showing a relationship between the engine load and the total fuel injection amount required for preheating of the catalyst 4. A transverse axis corresponds to that in FIG. 8. Herein, the more the engine load increases, the more the amount of the fuel injected from the fuel injection valve 6 per unit time increases, but since the temperature of the catalyst 4 rises rapidly, the time till the completion of the preheating of the catalyst 4 is shortened. Accordingly, the higher the engine load is, the smaller the total fuel injection amount required till the completion of the preheating of the catalyst 4 is. Accordingly, the consumption of the fuel can be decreased by increasing the engine load, so the deterioration of the fuel economy can be suppressed.

Figure 10:
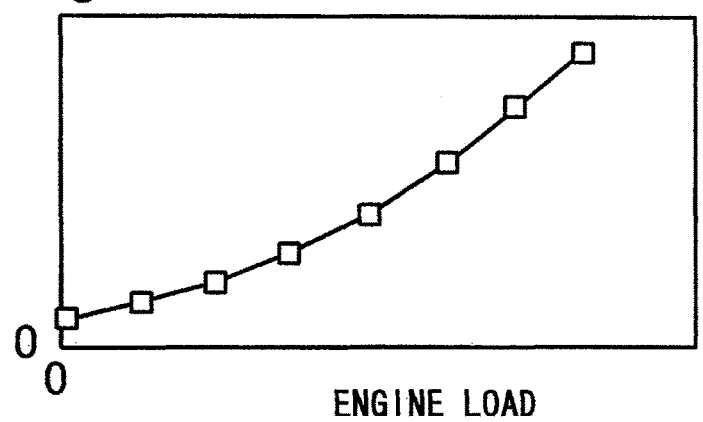
FIG. 10 is a view showing a relationship between the engine load and the discharge amount of the HC and NOx per unit time.

FIG. 10 is a view showing a relationship between the engine load and the discharge amount of the HC and NOx per unit time. A transverse axis corresponds to that in FIG. 8 and that in FIG. 9. The higher the engine load is, the larger the discharge amount of the HC and NOx per unit time is. Accordingly, the amount of the HC and NOx in the exhaust gas can be increased by increasing the engine load.

In this way, when the engine load is increased, the catalyst preheating time decreases, and the total fuel injection amount also decreases, but the discharge amount of the HC and NOx per unit time increases. Herein, even if the discharge amount of the HC and NOx per unit time increases, as long as the discharge amount can be purified by the catalyst 4, the case that the HC and NOx are discharged to the atmosphere can be suppressed. The purification performance of the catalyst 4 increases along with the rise of the temperature of the catalyst 4, so if the engine load is increased corresponding to the increase of the purification performance of the catalyst 4, the HC and NOx can be purified, and the catalyst preheating time and the total fuel injection amount are decreased.

However, in the case where the temperature of the catalyst 4 is smaller than the prescribed temperature, it is preferred that the discharge amount of the HC and NOx per unit time is comparatively small. Accordingly, in the case where the temperature of the catalyst 4 is smaller than the prescribed temperature, the amount of the HC and NOx discharged to the atmosphere can be decreased by means of an engine load fixed as one when the discharge amount of the HC and NOx per unit time is comparatively small.

In the embodiment, the electric motor 2 is used in the case where the engine load is made to increase as described above. That is, in the embodiment, the power generation is performed using an increment when the engine load is made to increase. Herein, when the electric motor 2 is used to perform the power generation, produced electric power is required to charge the storage battery 20. However, when the storage battery 20 is in a fully charged state, the storage battery 20 cannot be charged. Accordingly, when the storage battery 20 is in the fully charged state, the power generation by the electric motor 2 can hardly be performed, so it is hard to make the engine load increase. Thus, in the embodiment, only in the case where the storage battery 20 can be charged, the engine load is made to increase during the catalyst temperature rise control.

On the other hand, in the case where the retard angle amount of the ignition timing is made to increase and in the case where the engine speed is made to increase, no power generation is to be performed in the electric motor 2. Accordingly, even when the storage battery 20 is in the fully charged state, the increase of the retard angle amount of the ignition timing or the increase of the engine speed can be performed. For example, in the case where the storage battery 20 is in the fully charged state and the engine speed is made to increase, it is allowed as long as the electric motor 2 is not used to perform the power generation.

It should be noted that in the case where the engine load or the engine speed is made to increase, the throttle valve 9 can be opened. Moreover, in the case where the engine load or the engine speed is made to increase, a feedforward control or a feedback control of the electric motor 2 or the throttle valve 9 can be performed by making the engine load or the engine speed become a target value corresponding to the temperature of the catalyst 4. Moreover, in the case of a hybrid system having a power distribution mechanism that distributes power of the internal combustion engine 1 or a transmission that changes the rotation speed between the internal combustion engine 1 and a vehicle wheel, the power distribution mechanism or the transmission can be controlled in cooperation with the increase of the engine speed by avoiding the increase of the speed of the hybrid vehicle 100 due to the increase of the engine speed. Moreover, in the case where the increase of the retard angle amount of the ignition timing, the increase of the engine load or the increase of the engine speed can hardly be performed when the internal combustion engine 1 is used to drive the hybrid vehicle 100, a restriction can be made to a case that the hybrid vehicle 100 is only driven by the electric motor 2, i.e., a case that the internal combustion engine 1 is not used to drive the hybrid vehicle 100, to perform the increase of the retard angle amount of the ignition timing, the increase of the engine load or the increase of the engine speed. In addition, in the case where the increase of the retard angle amount of the ignition timing, the increase of the engine load or the increase of the engine speed can hardly be performed when the electric motor 2 is used to drive the hybrid vehicle 100, a restriction can be made to a case that the hybrid vehicle 100 is only driven by the internal combustion engine 1, i.e., a case that the electric motor 2 is not used to drive the hybrid vehicle 100, to perform the increase of the retard angle amount of the ignition timing, the increase of the engine load or the increase of the engine speed.

Figure 11:
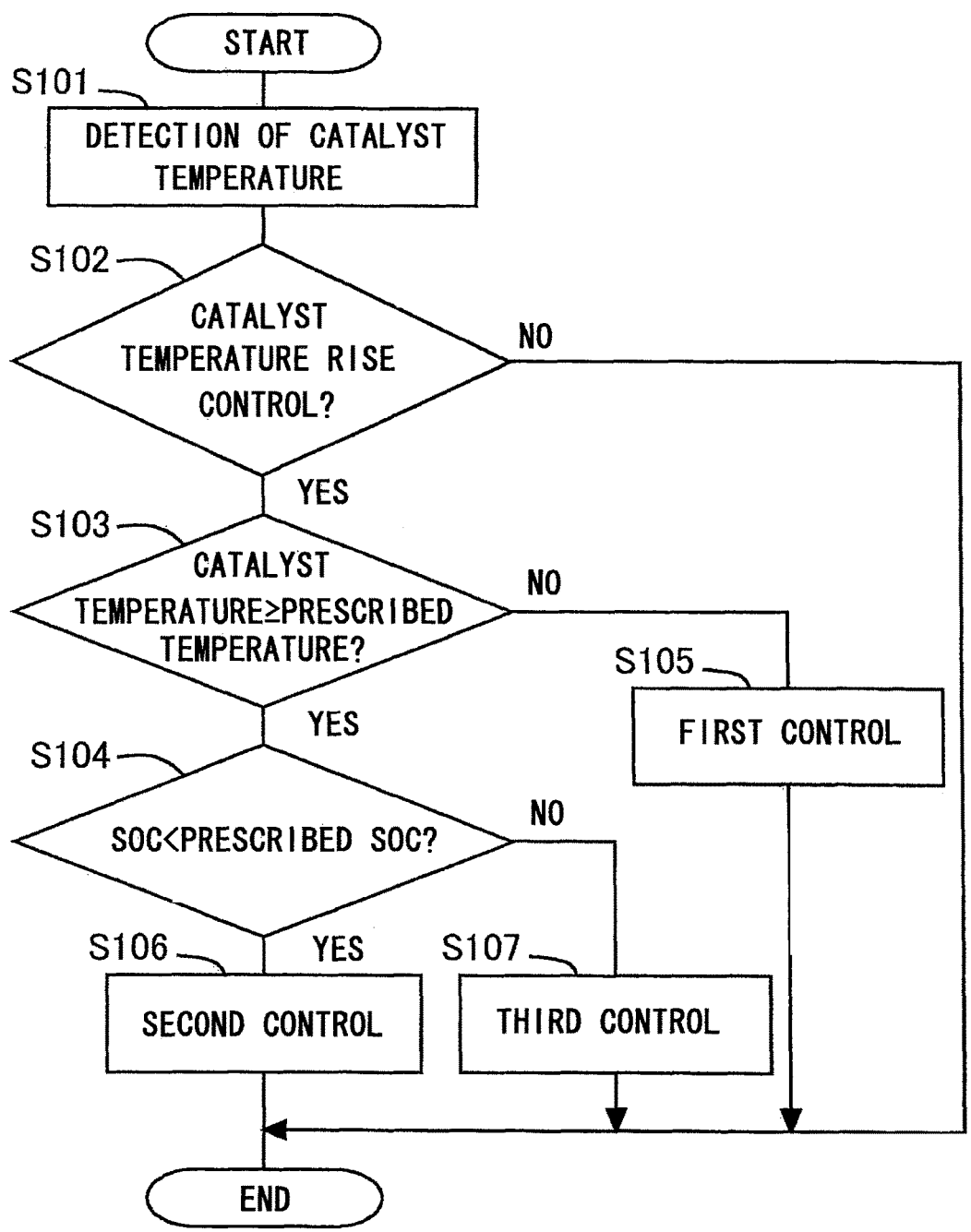
FIG. 11 is a flow chart of a catalyst temperature rise control.

FIG. 11 is a flow chart of a catalyst temperature rise control. The flow chart is performed by the ECU 100 per a prescribed time.

In a step S101, the temperature of the catalyst 4 is detected. The temperature of the catalyst 4 can be detected by the temperature sensor 5, but can be also deduced based on the running state of the internal combustion engine 1.

In a step S102, it is determined whether or not the catalyst temperature rise control is being performed. In this step, it is determined whether or not the preheating of the catalyst is not completed. That is, in this step, it is determined whether or not the temperature of the catalyst 4 detected in the step S101 is lower than a temperature at which the preheating of the catalyst 4 is completed. The temperature at which the preheating of the catalyst 4 is completed is a temperature at which the catalyst 4 can be fully activated. This temperature can be set to a temperature at which a required purification ability of the catalyst 4 can be played. It should be noted that for example, after the internal combustion engine 1 starts and in the case where a cooling water temperature is smaller than a threshold value, the catalyst temperature rise control is sometimes executed. Accordingly, for example, after the internal combustion engine 1 starts and in the case where the cooling water temperature is smaller than the threshold value and is lower than the temperature at which the preheating of the catalyst 4 is completed, the ECU 10 can be determined as one during the catalyst temperature rise control. A step S103 is entered in the case where a positive determination is made in the step S102, and on the other hand, the flow chart is ended in the case where a negative determination is made.

In the step S103, it is determined whether or not the temperature of the catalyst is equal to or larger than the prescribed temperature. The prescribed temperature is a temperature at which at least a part of the HC and NOx in the exhaust gas can be purified in the catalyst 4. The prescribed temperature can be set to a temperature at which the purification of the HC and NOx begins. A step S104 is entered in the case where a positive determination is made in the step S103, and on the other hand, a step S105 is entered in the case where a negative determination is made.

In the step S105, a first control is executed. During the first control, in order to decrease the discharge amount of the HC and NOx from the internal combustion engine 1 per unit time, the ignition timing, the engine speed, and the engine load are maintained as fixed values, respectively. Moreover, the engine load, the engine speed or the ignition timing during the first control is set to a value that is comparatively small as compared with a maximum value in the case where it is assumed that the engine load, the engine speed or the retard angle amount of the ignition timing is made to gradually increase during a second control or a third control as described later. In the step S105, the temperature of the catalyst 4 is low and can hardly perform the purification of the HC and NOx, so the ignition timing, the engine speed and the engine load are set by making the amount of the HC and NOx discharged from the internal combustion engine 1 be the smallest or be within an allowable range.

The ignition timing in the step S105 is a value that is a retard angle as compared with the ignition timing set in the case where the catalyst temperature rise control is not executed. In the case where the catalyst temperature rise control is not executed, for example, the ignition timing is set by making the fuel efficiency become optimal. As compared with the ignition timing when the fuel efficiency becomes optimal, the ignition timing when the HC and NOx discharged from the internal combustion engine 1 are the fewest is located on a retard angle side. Accordingly, the HC and NOx discharged from the internal combustion engine 1 can be decreased by making the ignition timing be a retard angle as compared with the ignition timing when the fuel efficiency becomes optimal. Herein, in the case where the temperature of the catalyst 4 is smaller than the prescribed temperature, the HC and NOx discharged from the internal combustion engine 1 are directly discharged to the atmosphere, so the ignition timing is determined by making the HC and NOx discharged from the internal combustion engine 1 be within the allowable range. In this case, in FIG. 4, the setting is performed by making the discharge amount of the HC and NOx per unit time be within the allowable range and making the retard angle amount of the ignition timing become the largest. Moreover, in FIG. 4, the ignition timing can be set to one when the discharge amount of the HC and NOx per unit time is the smallest. Furthermore, the ignition timing set at this time is maintained till the temperature of the catalyst 4 becomes one equal to or larger than the prescribed temperature.

The engine speed in the step S105 can be set to a highest engine speed among engine speeds when the discharge amount of the HC and NOx per unit time is within the allowable range in FIG. 7. Moreover, the engine speed can be lowered as far as possible. In this case, when the engine speed is excessively lowered, noise or vibration may exceed an allowable range, so the engine speed can be determined within a range where the noise or vibration is allowed. Furthermore, the engine speed set at this time is maintained till the temperature of the catalyst 4 becomes one equal to or larger than the prescribed temperature.

The engine load in the step S105 can be set to a highest engine load among engine loads when the discharge amount of the HC and NOx per unit time is within an allowable range in FIG. 10. Moreover, the engine load can be decreased as far as possible. Furthermore, the engine load set at this time is maintained till the temperature of the catalyst 4 becomes one equal to or larger than the prescribed temperature.

In this way, in the step S105, at least one of the ignition timing, the engine speed and the engine load is set, and the values are maintained till the temperature of the catalyst 4 becomes one equal to or larger than the prescribed temperature, so the discharge of the HC and NOx to the atmosphere can be suppressed, and the temperature of the catalyst 4 is made to rise rapidly. It should be noted that in the step S105, the engine load can be also made to increase independently of the SOC as described later. The reason is that when the first control is executed, the engine load and the engine speed are low, so a power generation amount of the electric motor 2 is small, thus it can be considered that the SOC almost does not increase. However, it is allowed that the engine load is not made to increase in the case where the SOC is equal to or larger than a prescribed SOC as that in the step S104 and that in a step S107 as described later.

Next, in the step S104, it is determined whether or not the SOC of the storage battery 20 is smaller than the prescribed SOC. It is determined in the step whether or not the storage battery 20 can be charged. That is, the prescribed SOC is set to an SOC when the storage battery 20 cannot be charged. The prescribed SOC can be also an SOC when the storage battery 20 is fully charged. A step S106 is entered in the case where a positive determination is made in the step S104, and on the other hand, the step S107 is entered in the case where a negative determination is made.

In the step S106, a second control is executed. During the second control, at least one of the retard angle of the ignition timing, the increase of the engine speed, and the increase of the engine load is executed. Moreover, during the second control, the retard angle amount of the ignition timing, the increment of the engine speed and the increment of the engine load are set in accordance with the temperature of the catalyst 4.

In the step S106, the retard angle amount of the ignition timing when the ignition timing is made to be the retard angle is set, by making the discharge amount of the HC and NOx from the internal combustion engine 1 become an amount that can be purified using the catalyst 4. That is, the more the retard angle amount of the ignition timing increases, the shorter the catalyst preheating time is (referring to FIG. 2), and the smaller the total fuel injection amount is (referring to FIG. 3), but the larger the discharge amount of the HC and NOx per unit time is (referring to FIG. 4), so the retard angle amount of the ignition timing is made to be the largest within a range where the discharge amount of the HC and NOx becomes the amount that can be purified by the catalyst 4. In this case, the retard angle amount of the ignition timing is made to increase along with the rise of the temperature of the catalyst 4. That is, when the catalyst temperature rise control is executed, the retard angle amount of the ignition timing is made to gradually increase in accordance with the temperature of the catalyst 4. It should be noted that the retard angle amount of the ignition timing can be also set by making the amount of the HC and NOx flowing out of the catalyst 4 be within the allowable range. The increase of the retard angle amount of the ignition timing can begin from the retard angle amount of the ignition timing during the first control. Moreover, when it is hard to perform the detection of the temperature of the catalyst 4 and the like, in the case where the temperature of the catalyst 4 rises along with an elapse of time, the retard angle amount of the ignition timing can be made to increase along with the elapse of time. Moreover, the retard angle amount of the ignition timing can increase continuously or increase step by step. A relationship between the temperature of the catalyst 4 and the retard angle amount of the ignition timing can be obtained beforehand by means of experiments, simulations or the like, and the retard angle amount of the ignition timing is set in accordance with the temperature of the catalyst 4.

In the step S106, the increment of the engine speed when the engine speed is made to increase is set, by making the discharge amount of the HC and NOx from the internal combustion engine 1 become the amount that can be purified by the catalyst 4. That is, the more the engine speed increases, the more the catalyst preheating time is shortened (referring to FIG. 5), and the more the total fuel injection amount decreases (referring to FIG. 6), but the more the discharge amount of the HC and NOx per unit time increases (referring to FIG. 7), so the engine speed is made to be the highest within a range where the discharge amount of the HC and NOx becomes the amount that can be purified by the catalyst 4. In this case, the engine speed is made to increase along with the rise of the temperature of the catalyst 4. That is, when the catalyst temperature rise control is executed, the engine speed is made to gradually increase. It should be noted that the increment of the engine speed can be also set by making the amount of the HC and NOx flowing out of the catalyst 4 be within the allowable range. The increase of the engine speed can begin from the engine speed during the first control. Moreover, when it is hard to perform the detection of the temperature of the catalyst 4 and the like, in the case where the temperature of the catalyst 4 rises along with an elapse of time, the engine speed can be made to increase along with the elapse of time. Moreover, the engine speed can increase continuously or increase step by step. A relationship between the temperature of the catalyst 4 and the engine speed can be obtained beforehand by means of experiments, simulations or the like, and the engine speed is set in accordance with the temperature of the catalyst 4.

In the step S106, the increment of the engine load when the engine load is made to increase is set, by making the discharge amount of the HC and NOx from the internal combustion engine 1 become the amount that can be purified by the catalyst 4. That is, the more the engine load increases, the shorter the catalyst preheating time is (referring to FIG. 8), and the smaller the total fuel injection amount is (referring to FIG. 9), but the larger the discharge amount of the HC and NOx per unit time is (referring to FIG. 10), so the engine load is made to be the highest within a range where the discharge amount of the HC and NOx becomes the amount that can be purified by the catalyst 4. In this case, the engine load is made to increase along with the rise of the temperature of the catalyst 4. That is, when the catalyst temperature rise control is executed, the engine load is made to gradually increase. It should be noted that the increment of the engine load can be set by making the amount of the HC and NOx flowing out of the catalyst 4 be within the allowable range. The increase of the engine load can begin from the engine load during the first control. Moreover, when it is hard to perform the detection of the temperature of the catalyst 4 and the like, in the case where the temperature of the catalyst 4 rises along with an elapse of time, the engine load can be made to increase along with the elapse of time. Moreover, the engine load can increase continuously or increase step by step. A relationship between the temperature of the catalyst 4 and the engine load can be obtained beforehand by means of experiments, simulations or the like, and the engine load is set in accordance with the temperature of the catalyst 4.

In this way, in the step S106, at least one of the retard angle of the ignition timing, the increase of engine speed and the increase of engine load corresponding to the temperature of the catalyst 4 is executed, and the values thereof are made to gradually increase, so the discharge of the HC and NOx to the atmosphere can be suppressed, and the temperature of the catalyst 4 is made to rise rapidly. Moreover, the fuel amount required for the rise of the temperature of the catalyst 4 can be decreased, so the deterioration of the fuel efficiency can be suppressed.

On the other hand, in the step S107, a third control is executed. During the third control, at least one of the retard angle of the ignition timing and the increase of the engine speed is executed. Moreover, during the third control, the retard angle amount of the ignition timing or the increment of the engine speed is set in accordance with the temperature of the catalyst 4. During the third control, the charging of the storage battery 20 is restricted, so the case that the engine load is made to gradually increase in accordance with the temperature of the catalyst 4 is not executed. The retard angle of the ignition timing or the increase of the engine speed is executed as that in the step S106. The engine load can be set to a value that is the same as that during the first control.

Herein, after the internal combustion engine 1 just starts, the temperature of the catalyst 4 is low, so the first control is executed in the step S105. Since the first control is repeatedly executed, the temperature of the catalyst 4 rises. Moreover, when the temperature of the catalyst 4 becomes one equal to or larger than the prescribed temperature, an advance is made to the step S106 or the step S107 to execute the second control or the third control, and the temperature of the catalyst 4 further rises. When the SOC becomes one equal to or larger than the prescribed SOC during the execution of the second control, it is switched to the third control. On the other hand, when the SOC becomes one smaller than the prescribed SOC during the execution of the third control, it is switched to the second control. Moreover, in the case where it is determined in the step S102 that the preheating of the catalyst is completed, the second control or the third control is finished. In this way, the temperature of the catalyst 4 can be made to rise rapidly.

Figure 12:
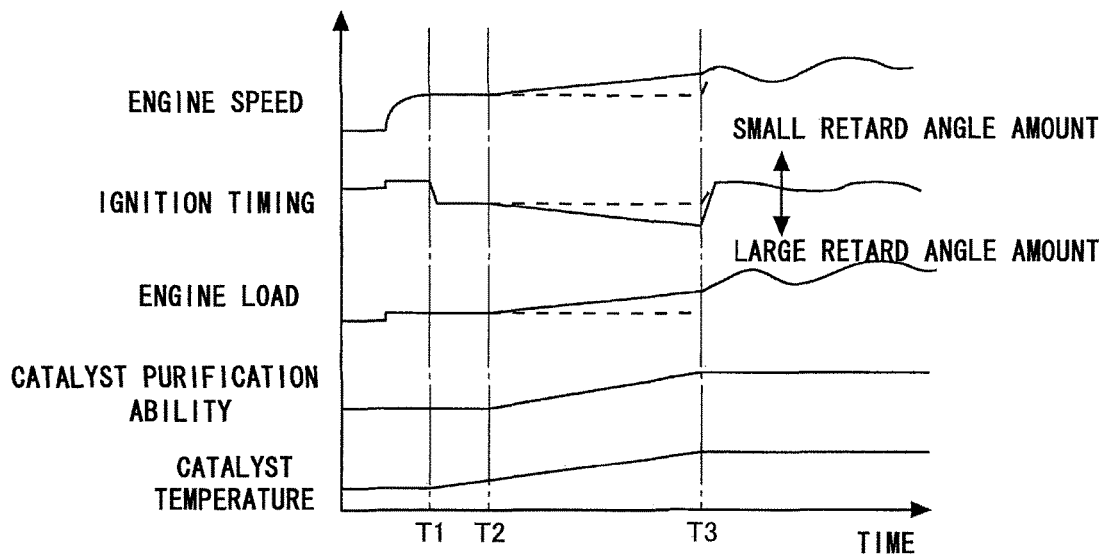
FIG. 12 is a time chart showing a transition of various values when the catalyst temperature rise control is executed.

FIG. 12 is a time chart showing a transition of various values when the catalyst temperature rise control is executed. FIG. 12 shows a case that the SOC of the storage battery 20 is smaller than the prescribed SOC, and shows a case that the first control and the second control are executed. The solid lines denote a case that the catalyst temperature rise control according to the embodiment is executed, and the broken lines denote a case that a treatment executed in the step S105 still continues in the case where the temperature of the catalyst 4 becomes one equal to or larger than the prescribed temperature. The first control is executed during a period from T1 to T2, and the second control is executed during a period from T2 to T3.

When the internal combustion engine 1 starts and reaches a timing as shown by T1, the catalyst temperature rise control begins. In FIG. 12, the ignition timing is made to be a retard angle. At this time, since the temperature of the catalyst is smaller than the prescribed temperature, the retard angle amount of the ignition timing is fixed. The engine speed and the engine load are also maintained as fixed values, respectively. After the timing as shown by T1, the temperature of the catalyst 4 gradually rises.

At a timing shown by T2, the temperature of the catalyst reaches the prescribed temperature. After the timing as shown by T2, the engine speed is made to gradually increase, the retard angle amount of the ignition timing is made to gradually increase, and the engine load is made to gradually increase, in cooperation with the rise of the temperature of the catalyst 4. Moreover, at a timing shown by T3, the catalyst temperature rise control is finished when the temperature of the catalyst 4 reaches a temperature at which the preheating of the catalyst is completed (i.e., when a negative determination is made in the step S102).

Figure 13:
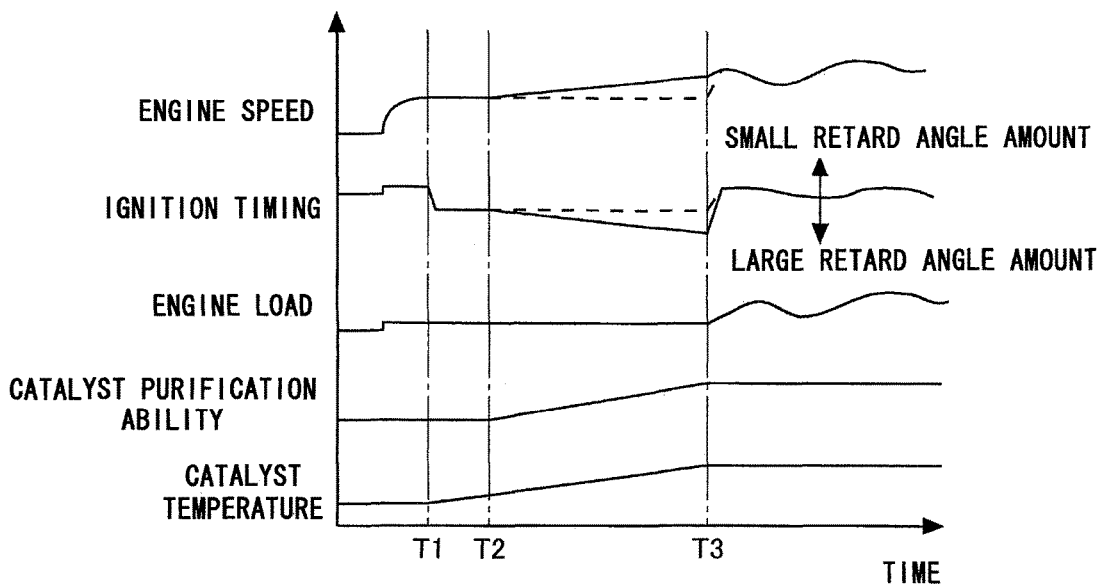
FIG. 13 is a time chart showing the transition of the various values when the catalyst temperature rise control is executed.

On the other hand, FIG. 13 is a time chart showing the transition of various values when the catalyst temperature rise control is executed. FIG. 13 shows a case that the SOC of the storage battery 20 is equal to or larger than the prescribed SOC, and shows a case that the first control and the third control are executed. The first control is executed during a period from T1 to T2, and the third control is executed during a period from T2 to T3. A treatment the same as that in FIG. 12 is executed till a timing as shown by T2. In FIG. 13, after the timing as shown by T2, the engine speed and the retard angle amount of the ignition timing are made to gradually increase in cooperation with the rise of the temperature of the catalyst 4, but the engine load is still maintained fixed. Even so, the temperature of the catalyst can be made to rise.

As described above, according to the embodiment, in the case where the temperature of the catalyst 4 is a temperature at which the purification of the HC and NOx can hardly performed (i.e., in the case where the temperature of the catalyst 4 is smaller than the prescribed temperature), at least one of the ignition timing, the engine speed and the engine load is set by making the discharge amount of the HC and NOx from the internal combustion engine 1 decrease, so the discharge of the HC and NOx to the atmosphere can be suppressed, and the temperature of the catalyst 4 is made to rise rapidly.

Moreover, after the temperature of the catalyst 4 rises to a temperature at which the HC and NOx can be purified, at least one of the retard angle amount of the ignition timing, the increment of the engine speed and the increment of the engine load is gradually increased in accordance with the purification ability of the catalyst 4, thus the discharge of the HC and NOx to the atmosphere can be suppressed, and the temperature of the catalyst 4 is made to rise rapidly. Moreover, a period for executing the catalyst temperature rise control can be shortened, so the deterioration of the fuel efficiency can be suppressed.

Moreover, in the case where the charging of the storage battery 20 is restricted, the increase of the engine load is restricted. Even in this case, by gradually increasing at least one of the retard angle amount of the ignition timing and the increment of the engine speed, the discharge of the HC and NOx to the atmosphere can be suppressed, and the temperature of the catalyst 4 is made to rise rapidly.

What is claimed is:

1. A control system of an internal combustion engine, comprising a control device, which makes a temperature of a catalyst rise, the catalyst being provided on an exhaust passage of the internal combustion engine in a hybrid vehicle having the internal combustion engine and an electric motor, wherein:
   in a case where the temperature of the catalyst is equal to or larger than a prescribed temperature that is a temperature at which purification of an exhaust gas in the catalyst begins, and charging of a storage battery is not restricted, the control device makes at least one of an engine load, an engine speed, and a retard angle amount of an ignition timing gradually increase; and
   in a case where the temperature of the catalyst is equal to or larger than the prescribed temperature and the charging of the storage battery is restricted, the control device fixes the engine load and makes at least one of the engine speed and the retard angle amount of the ignition timing gradually increase.

2. The control system according to claim 1, wherein:
   in a case where the temperature of the catalyst is smaller than the prescribed temperature, the control device fixes the engine load, the engine speed and the retard angle amount of the ignition timing; and
   the engine load, the engine speed or the retard angle amount of the ignition timing in the case where the temperature of the catalyst is smaller than the prescribed temperature is set to a value smaller than a maximum value when the engine load, the engine speed or the retard angle amount of the ignition timing is made to gradually increase in a case where the temperature of the catalyst is equal to or larger than the prescribed temperature.

3. The control system according to claim 1, wherein the control device makes the engine load, the engine speed or the retard angle amount of the ignition timing increase corresponding to the temperature of the catalyst, when making the engine load, the engine speed or the retard angle amount of the ignition timing gradually increase.

4. The control system according to claim 1, wherein, in a case where a state of charge of the storage battery is not smaller than a prescribed value, the charging of the storage battery is restricted.

5. A control method for a control system of an internal combustion engine, comprising a control device, which makes a temperature of a catalyst rise, the catalyst being provided on an exhaust passage of the internal combustion engine in a hybrid vehicle having the internal combustion engine and an electric motor, wherein:
- in a case where the temperature of the catalyst is equal to or larger than a prescribed temperature that is a temperature at which purification of an exhaust gas in the catalyst begins, and charging of a storage battery is not restricted, the control device makes at least one of an engine load, an engine speed, and a retard angle amount of an ignition timing gradually increase; and
- in a case where the temperature of the catalyst is equal to or larger than the prescribed temperature and the charging of the storage battery is restricted, the control device fixes the engine load and makes at least one of the engine speed and the retard angle amount of the ignition timing gradually increase.

* * * * *